(12) United States Patent
Gutmann et al.

(10) Patent No.: US 12,539,543 B2
(45) Date of Patent: Feb. 3, 2026

(54) MANUFACTURING DEVICE, METHOD AND COMPUTER PROGRAM PRODUCT FOR THE ADDITIVE MANUFACTURE OF COMPONENTS FROM A POWDER MATERIAL

(71) Applicant: TRUMPF Laser-und Systemtechnik GmbH, Ditzingen (DE)

(72) Inventors: Bernhard Gutmann, Pfaffenhofen a.d. Glonn (DE); Michael Staiger, Stuttgart (DE); Sarah Leuck, Ludwigsburg (DE); Stefan Findeisen, Freiberg am Neckar (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 394 days.

(21) Appl. No.: 18/169,914

(22) Filed: Feb. 16, 2023

(65) Prior Publication Data

US 2023/0191496 A1     Jun. 22, 2023

Related U.S. Application Data

(63) Continuation of application No. PCT/EP2021/072972, filed on Aug. 18, 2021.

(30) Foreign Application Priority Data

Aug. 24, 2020    (DE) .................... 10 2020 210 724.6

(51) Int. Cl.
*B22F 12/90*     (2021.01)
*B22F 10/28*     (2021.01)
(Continued)

(52) U.S. Cl.
CPC .............. *B22F 12/90* (2021.01); *B22F 10/28* (2021.01); *B22F 10/31* (2021.01); *B22F 10/366* (2021.01);
(Continued)

(58) Field of Classification Search
CPC B23K 15/086; B28B 1/001; B22F 2003/1057
See application file for complete search history.

(56) References Cited

U.S. PATENT DOCUMENTS

| 2006/0192322 | A1 | 8/2006 | Abe et al. | |
| 2018/0178284 | A1* | 6/2018 | Martin | ............... B23K 15/0093 |
| 2018/0215095 | A1* | 8/2018 | Amaya | ................... B29C 64/20 |

FOREIGN PATENT DOCUMENTS

| DE | 102017212565 A1 | 1/2019 |
| DE | 102018203233 A1 | 9/2019 |

(Continued)

OTHER PUBLICATIONS

B. Ferrar et al, "Gas flow effects on selective laser melting (SLM) manufacturing performance," Journal of Materials Processing Technology, Feb. 2012, pp. 355-364, vol. 212, Issue 2, Elsevier, Amsterdam, Netherlands.

*Primary Examiner* — Nicholas A Wang
(74) *Attorney, Agent, or Firm* — LEYDIG, VOIT & MAYER, LTD.

(57) ABSTRACT

A manufacturing device for additive manufacture of components includes a beam generation device configured to generate energy beams, a scanner device configured to locally and selectively irradiate a working region with the energy beams, a protective gas device configured to generate a protective gas flow over the working region, and a control device configured to drive the scanner device. The control device is configured to define a first irradiation region along which a first irradiation section is displaced from a first starting position to a first end position, to define a second (Continued)

irradiation region along which a second irradiation section is displaced from a second starting position to a second end position, and to begin irradiation of the second irradiation region when the first irradiation section and the second starting position are not arranged within an interaction zone defined by a protective gas flow direction relative to one another.

14 Claims, 3 Drawing Sheets

(51) Int. Cl.
  *B22F 10/31* (2021.01)
  *B22F 10/366* (2021.01)
  *B22F 12/45* (2021.01)
  *B22F 12/49* (2021.01)
  *B22F 12/70* (2021.01)
  *B33Y 10/00* (2015.01)
  *B33Y 30/00* (2015.01)
  *B33Y 50/02* (2015.01)

(52) U.S. Cl.
  CPC .............. *B22F 12/45* (2021.01); *B22F 12/49* (2021.01); *B22F 12/70* (2021.01); *B33Y 10/00* (2014.12); *B33Y 30/00* (2014.12); *B33Y 50/02* (2014.12); *B22F 2998/10* (2013.01)

(56) References Cited

FOREIGN PATENT DOCUMENTS

| | | |
|---|---|---|
| DE | 102019211846 A1 | 2/2021 |
| EP | 2786858 A1 | 10/2014 |
| EP | 3272505 A1 | 1/2018 |
| EP | 2978589 B1 | 6/2019 |
| EP | 3539754 A1 | 9/2019 |
| JP | 2010265530 A | 11/2010 |
| JP | 2018126985 A | 8/2018 |
| WO | WO 2018118333 A1 | 6/2018 |
| WO | WO 2019211587 A1 | 11/2019 |

\* cited by examiner

Fig. 3c

MANUFACTURING DEVICE, METHOD AND COMPUTER PROGRAM PRODUCT FOR THE ADDITIVE MANUFACTURE OF COMPONENTS FROM A POWDER MATERIAL

CROSS REFERENCE TO RELATED APPLICATIONS

This application is a continuation of International Application No. PCT/EP2021/072972 (WO 2022/043164 A1), filed on Aug. 18, 2021, and claims benefit to German Patent Application No. DE 10 2020 210 724.6, filed on Aug. 24, 2020. The aforementioned applications are hereby incorporated by reference herein.

FIELD

Embodiments of the present invention relate to a manufacturing device, to a method and to a computer program product for the additive manufacture of components from a powder material.

BACKGROUND

During the additive manufacture of components from a powder material, an energy beam is typically displaced to predetermined irradiation positions of a working region—in particular along a predetermined irradiation path—in order to locally solidify powder material arranged in the working region. In particular, this is repeated layer-by-layer in powder material layers successively arranged in the working region in order to ultimately obtain a three-dimensional component made of solidified powder material.

WO 2018/118333 A1 discloses a manufacturing device for the additive manufacture of components from a powder material, which comprises, as beam generation device, a plurality of lasers that are configured to generate a plurality of laser beams as energy beams. The manufacturing device additionally has a scanner device that is configured to locally and selectively irradiate a working region with the energy beams in order to produce a component from the powder material arranged in the working region by way of the energy beams. The manufacturing device furthermore has a protective gas device that is configured to generate a protective gas flow with a defined protective gas flow direction over the working region. The manufacturing device also has a control device that is operatively connected to the scanner device and is configured to drive the scanner device. The control device is in this case configured in particular to scan the working region with the energy beams.

Trajectories of the energy beams on the working region are in this case controlled such that the energy beams do not interact with a cloud of contaminants, consisting for example of particles of dirt, smoke or powder deposits, regardless of whether the cloud of contaminants is generated by one and the same energy beam or by another energy beam. Specifically, the energy beams may otherwise be scattered and/or attenuated in an unpredictable manner by the cloud of contaminants, which may reduce the quality of the resulting component. Furthermore, it may also reduce the quality of the resulting component if an energy beam impinges on a location within the working region at which contaminants are present, these having been introduced from another location—in particular due to the protective gas flow. In order to control the trajectories of the energy beams accordingly, it is proposed for example to monitor or to simulate trajectories of the clouds of contaminants. This proves to be very difficult. It is also proposed to assign the energy beams respective separate regions on the working region, these being arranged with respect to one another such that clouds of contaminants are not able to pass from one region to another region—and vice versa. However, this restricts the freedom of movement of the energy beams and flexibility when manufacturing the component to a very large extent. It is also proposed to stop the irradiation with an energy beam and to restart the irradiation following a local offset or jump when the energy beam would otherwise cross a cloud of contaminants. The energy beam thereby jumps over the cloud of contaminants, as it were. However, this too is a difficult and complicated procedure. Finally, it is proposed to stop an energy beam that causes a cloud of contaminants so as to create a gap in the cloud of contaminants through which another energy being is able to be displaced. However, this too is a very complicated and ultimately unpredictable and/or non-reproducible process.

SUMMARY

Embodiments of the present invention provide a manufacturing device for additive manufacture of components from a powder material. The manufacturing device includes a beam generation device configured to generate a plurality of energy beams, a scanner device configured to locally and selectively irradiate a working region with the plurality of energy beams in order to produce a component from the powder material arranged in the working region, a protective gas device configured to generate a protective gas flow with a defined protective gas flow direction over the working region, and a control device operatively connected to the scanner device and configured to drive the scanner device. The control device is further configured to define a first irradiation region on the working region for a first energy beam of the plurality of energy beams. A first irradiation section for the first energy beam is displaced within the first irradiation region from a first starting position to a first end position. The control device is further configured to define a second irradiation region upstream of the first irradiation region on the working region for a second energy beam of the plurality of energy beams. A second irradiation section for the second energy beam is displaced within the second irradiation region from a second starting position to a second end position. The control device is further configured to begin irradiation of the second irradiation region with the second energy beam when the first irradiation section and the second starting position for the second irradiation section are not arranged within an interaction zone defined by the protective gas flow direction relative to one another.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention provide a manufacturing device, a method and a computer program product for the additive manufacture of components from a powder material.

More particularly, embodiments of the present invention provide a manufacturing device for the additive manufacture of components from a powder material such that the control device is configured to define a first irradiation region on the working region for a first energy beam of the plurality of energy beams. along which a first irradiation section for the first energy beam is displaced within the first irradiation region from a first starting position to a first end position—in particular systematically, in particular along a determined displacement direction, in particular in one go, that is to say preferably without jumps between different regions of the irradiation region. The control device is furthermore configured to define a second irradiation region upstream—with respect to the protective gas flow direction—of the first irradiation region on the working region for a second energy beam of the plurality of energy beams, along which a second irradiation section for the second energy beam is displaced within the second irradiation region from a second starting position to a second end position—in particular systematically, in particular along a determined displacement direction, in particular in one go, that is to say preferably without jumps between different regions of the irradiation region. The control device is furthermore configured to begin irradiation of the second irradiation region with the second energy beam when the first irradiation section and the second starting position for the second irradiation section are not arranged within an interaction zone defined by the protective gas flow direction relative to one another. This makes it possible, in a particularly simple manner and in particular without complicated outlay in terms of detection or calculation, to avoid the energy beams working in the region of possible clouds of contaminants or in regions where contaminants have been deposited on the working region, with at the same time however high flexibility being achieved with regard to the arrangement of the irradiation regions relative to one another and thus also with regard to the local division of the treatment of the working region with the various energy beams, in particular due to the offset at the beginning of the irradiation. Last but not least, this makes it possible to utilize heating or preheating of the resulting component by the first energy beam in the treatment by the second energy beam, in order in particular to avoid warping in the resulting component where possible. The energy beams are thus in particular able to work comparatively close to one another without in the process creating the risk of interfering with one another through the contaminants that arise.

The control device is preferably configured to begin irradiation of the second irradiation region with the second energy beam at a time after a beginning of the irradiation of the first irradiation region with the first energy beam, when the first irradiation section and the second starting position for the second irradiation section are not arranged within an interaction zone defined by the protective gas flow direction relative to one another.

The second irradiation region is in this case arranged upstream of the first irradiation region with respect to the protective gas flow direction, this meaning in particular that contaminants generated by the second energy beam are able to pass into the first irradiation region by way of the protective gas flow. Unlike in the prior art, provision is thus expressly not made here for the irradiation regions to be selected such that no contaminants whatsoever are able to pass from one irradiation region to another—or vice versa. Nevertheless, this does not have any negative consequences, since the offset at the beginning of the irradiation ensures that the energy beams do not interact with the contaminants of the respective other energy beams.

The working region is irradiated with the energy beams at times simultaneously, but in a spatially offset manner. In other words, the energy beams are displaced at least at times simultaneously in the working region—in particular including in one and the same component section—and interact with the powder material. However, they are in the process always spatially offset from one another, and no two energy beams thus treat the same location on the working region at the same time.

The control device is configured to displace the irradiation section within the respective irradiation region systematically, in particular with a defined displacement direction. In this case, the control device is preferably configured to perform this displacement in one go, that is to say without jumps, which ultimately means that the irradiation section, on the path from the starting position to the end position, does not initially jump over regions of the irradiation region in order subsequently to jump back thereto, but rather that regions of the irradiation region that are arranged in succession from the starting position to the end position are also irradiated in temporal succession in the order predetermined by the geometric situation between the starting position and the end position.

The second starting position is preferably arranged adjacent to the first starting position on the working region. The first starting position is located in particular within the interaction zone of the second starting position, and/or vice versa. The offset at the beginning of the irradiation of the first irradiation region and of the second irradiation region nevertheless ensures that no quality defects caused by impairments between the starting positions arise. In this case, the beginning of the irradiation of the second irradiation region may however take place so shortly after the beginning of the irradiation of the first irradiation region that the resulting component—in particular in powder material layers arranged underneath a powder material layer currently being treated—has not yet cooled to such an extent that quality defects caused by warping would need to be feared. On the contrary, preheating brought about by the first energy beam may be utilized to increase productivity and quality during the irradiation with the second energy beam.

The displacement of the second irradiation section from the second starting position to the second end position within the second irradiation region preferably takes place in the same direction, in particular with the same displacement direction, as the displacement of the first irradiation section within the first irradiation region.

An irradiation region is understood to mean in particular a region that is irradiated with one of the energy beams completely, in particular systematically, in particular with a defined displacement direction, in particular in one go, in particular without jumps, in particular without the energy beam being displaced to another irradiation region in the meantime. If an irradiation region has been irradiated completely, the energy beam preferably jumps to a next irradiation region, which is then irradiated systematically with the energy beam, before the energy beam again jumps to a further irradiation region. An irradiation region is thus in particular a contiguous area on the working region that is passed over by the energy beam without interruption.

An irradiation section by contrast is in particular a sub-region of the irradiation region in which the energy beam irradiates the powder material arranged in the working region at a given time, in particular at a respective instantaneous time. The irradiation section is accordingly displaced within the irradiation region when the irradiation region is passed over by the energy beam.

An interaction zone is understood to mean an area on the working region that is impaired by contaminants arising at a particular location within or outside the interaction zone, whether this be caused by a cloud of contaminants or by deposited contaminants, such as for example smoke, powder deposits or particles of dirt. Each irradiation section, currently being treated, of an energy beam is in particular assigned an interaction zone that is influenced by contaminants arising in the irradiation section. The fact that the first irradiation section and the second starting position for the second irradiation section are not arranged within such an interaction zone relative to one another accordingly means in particular that the first irradiation section is not arranged in an interaction zone assigned to the second starting position, and/or that—preferably additionally—the second starting position is not arranged in an interaction zone assigned to the first irradiation section.

The fact that the interaction zone is defined by the protective gas flow direction means in particular that the protective gas flow direction at least contributes to defining the orientation and arrangement of the interaction zone, wherein it preferably defines the arrangement and orientation of the interaction zone. The protective gas flow direction essentially defines where contaminants arising in an irradiation section are displaced to. At the same time, however, it is not necessary for the protective gas flow direction alone to define the interaction zone. On the contrary, the interaction zone may also extend in other directions, in particular including, in regions, counter to the protective gas flow direction, since specifically contaminants, in particular smoke, powder deposits and/or spray, may also be displaced, at least over a limited distance, counter to the protective gas flow direction or laterally to the protective gas flow direction on account of an initial pulse. The interaction zone may thus, in addition to the protective gas flow direction, be defined by further parameters.

The method steps illustrated here and to be performed by the control device are preferably repeated within a powder material layer until the powder material layer is irradiated in all areas or component sections to be irradiated. In this case, the second irradiation region is in particular preferably a further first irradiation region for a third irradiation region, which is then in turn a new, second irradiation region in relation to the further first irradiation region, that is to say the previous second irradiation region. The process described here may thus be iterated, in particular as desired, along the powder material layer. It is possible in this case for the first energy beam and the second energy beam to act alternately on the various irradiation regions; however, it is also possible to use more than two energy beams, for example three energy beams, or more than three energy beams.

At the same time, the process according to various embodiments of the present invention is preferably performed again on each new powder material layer, that is to say repeated from powder material layer to powder material layer until the component to be produced has been built up in layers. The process described up until now refers in this case in particular to exactly one powder material layer; the various irradiation regions are thus defined in particular in the same powder material layer, and preferably the same again for each new powder material layer.

Additive or generative manufacture or production of a component is understood to mean building up a component layer-by-layer from powder material—powder material layer by powder material layer—in particular a powder-bed-based method for producing a component in a powder bed, in particular a manufacturing method selected from a group consisting of selective laser sintering, laser metal fusion (LMF), direct metal laser melting (DMLM), laser net shaping manufacturing (LNSM), and laser engineered net shaping (LENS). Accordingly, the manufacturing device is configured in particular to perform at least one of the abovementioned additive or generative manufacturing methods.

In general, an energy beam is understood to mean directed radiation that is able to transport energy. In general, this may be particle radiation or wave radiation. In particular, the energy beam propagates through physical space along a propagation direction and transports energy along its propagation direction in the process. In particular, local deposition of energy in the working region is possible by way In some embodiments, the energy beam is an optical working beam. An optical working beam is understood to mean in particular directed, either continuous or pulsed, electromagnetic radiation which, in terms of its wavelength or a wavelength range, is suitable for additive or generative manufacture of a component from powder material, in particular for sintering or melting the powder material. An optical working beam is understood to mean in particular a laser beam that is able to be generated continuously or in pulsed fashion. The optical working beam preferably has a wavelength or a wavelength range within the visible electromagnetic spectrum or within the infrared electromagnetic spectrum or within the overlap range between the infrared range and the visible range of the electromagnetic spectrum.

A working region is understood to mean in particular a region, in particular a plane or surface, in which the powder material is arranged and is locally irradiated with the energy beam to locally solidify the powder material. The powder material is in particular arranged sequentially in layers in the working region and irradiated locally with the energy beam in order to produce a component layer by layer.

The fact that an energy beam acts locally on the working region means in particular that the energy beam does not act on the entire working region globally—neither instantaneously nor sequentially—but rather that the energy beam acts on the working region at certain locations, in particular at individual locations that are contiguous or separate from one another, wherein the energy beam is in particular displaced within the working region by way of the scanner device. The fact that the energy beam acts selectively on the working region means in particular that the energy beam acts on the working region at selected, predetermined locations or places or in selected, predetermined regions. The working region is in particular a powder material layer or a preferably contiguous area of a powder material layer that the energy beam is able to reach with the aid of the scanner device, that is to say it comprises in particular locations, places or regions of the powder material layer on which the energy beam is able to act.

The protective gas device preferably has at least one protective gas outlet, in particular a nozzle, preferably a plurality of protective gas outlets, in particular nozzles, which are in particular arranged next to one another and preferably oriented parallel to one another. The at least one protective gas outlet is in particular configured to bring about a directed flow of the protective gas out of the protective gas outlet and thus to define the protective gas flow direction.

According to some embodiments, the protective gas device additionally has at least one protective gas inlet, in particular a plurality of protective gas inlets, which are preferably arranged next to one another and in particular oriented parallel to one another and through which the protective gas is able to pass back into the protective gas device from the working region. In particular, the at least one protective gas inlet is preferably arranged opposite the at least one protective gas outlet as seen in the protective gas flow direction, wherein the working region is arranged between the at least one protective gas inlet and the at least one protective gas outlet. In some embodiments, the protective gas device has an extraction device, in particular a pump, by way of which the protective gas is able to be extracted from the working region via the at least one protective gas inlet. A combination of a defined flow of the protective gas out of the at least one protective gas outlet and a defined extraction of the protective gas via the at least one protective gas inlet in particular makes it possible to define the protective gas flow direction over the working region with particularly high precision.

The control device is preferably selected from a group consisting of a computer, in particular a personal computer (PC), a plug-in card or control card, and an FPGA board. In some embodiments, the control device is an RTC6 control card from SCANLAB GmbH, in particular in the configuration currently obtainable on the priority date of the present property right.

The scanner device preferably has at least one scanner, in particular a galvanometer scanner, a piezo scanner, a polygon scanner, an MEMS scanner, and/or a working head or treatment head able to be displaced relative to the working region-preferably, for each energy beam, at least one such element assigned separately to the energy beam. The devices proposed here are particularly suitable for displacing the energy beams between a plurality of irradiation positions within the working region.

A working head or treatment head that is able to be displaced relative to the working region is understood here to mean in particular an integrated component of the manufacturing device that has at least one radiation outlet for at least one energy beam, wherein the integrated component, that is to say the working head, as a whole is able to be displaced along at least one displacement direction, preferably along two mutually perpendicular displacement directions, relative to the working region. Such a working head may in particular be embodied with a gantry design or be guided by a robot. The working head may in particular be designed as a robot hand of a robot.

According to some embodiments, provision is made for the control device to be configured, based on the first irradiation section, to determine a first blocking region that is displaced along the first irradiation region with the first irradiation section. As an alternative or in addition, the control device, based on the second irradiation section, preferably determines a second blocking region that is displaced along the second irradiation region with the second irradiation section. Defining the respective blocking regions makes it possible to ensure, in a particularly simple manner, that the irradiation of the second irradiation region begins only, in particular for the first time, when the first irradiation section and the second starting position for the second irradiation section are not arranged within the corresponding interaction zone relative to one another. There is thus no need for any explicitly temporal consideration of the beginning of the irradiation, but rather the—possibly temporal—offset may be predefined implicitly by the definition of the blocking regions.

As an alternative, however, explicitly temporal control is also possible; or an offset is predefined in the form of a number of irradiation vectors that are to be worked through by the first energy beam, or in the form of a specific displacement path to be taken for the first irradiation section until the irradiation with the second energy beam is allowed to begin.

A blocking region is in this case understood to mean a region that is defined for a particular energy beam and thus a particular irradiation section, and in which no other energy beam is allowed to be displaced. The blocking region assigned to an irradiation section is in this case preferably the same as the interaction zone assigned to the irradiation section or larger than the interaction zone. A safety margin with regard to the actual interaction zone may in particular be taken into consideration when defining the blocking region.

The blocking region preferably extends over a predetermined extent within the working region around the irradiation section assigned thereto and—in the protective gas flow direction—downstream of the irradiation section.

According to some embodiments, provision is made for the control device to be configured to begin the irradiation of the second irradiation region with the second energy beam only when at least one starting condition is met, wherein the at least one starting condition is selected from a group consisting of: The second starting position is not located within the first blocking region; the first irradiation section is not located within the second blocking region at the second starting position; and the first blocking region and the second blocking region do not overlap one another. Each of these three conditions is in particular suitable on its own for selecting an offset between the beginning of the irradiation of the second irradiation region and the beginning of the irradiation of the first irradiation region so as to ensure that the first irradiation section and the second starting position for the second irradiation section are not arranged in the corresponding interaction zone relative to one another.

According to some embodiments, the irradiation of the second irradiation region with the second energy beam is begun only when at least two starting conditions, selected from the abovementioned group, are met.

According to some embodiments, the irradiation of the second irradiation region with the second energy beam is begun only when all three starting conditions of the abovementioned group are met in combination.

The fact that the second starting position is not located in the first blocking region means in particular that the second starting position does not spatially overlap the first blocking region; according to some embodiments, this means in particular that the second starting position is not arranged completely in the first blocking region.

The fact that the first irradiation section is not located within the second blocking region at the second starting position means, according to some embodiments, in particular that the first irradiation section does not overlap the second blocking region at the second starting position; according to some embodiments, this means in particular that the first irradiation section is not located completely within the second blocking region at the second starting position.

The reference to the "second blocking region at the second starting position" means in particular that consideration is given to the second blocking region as arises when the second irradiation section is located at the second starting position.

According to some embodiments, provision is made for the control device to be configured to define the first irradiation region and the second irradiation region directly adjacent to one another on the working region. In particular, the first irradiation region and the second irradiation region are preferably defined on the working region such that the first irradiation region and the second irradiation region adjoin one another. It is possible for the first irradiation region and the second irradiation region to abut one another precisely along a defined boundary line; however, it is also possible for the first irradiation region and the second irradiation region to overlap in regions. If the first irradiation region and the second irradiation region are defined directly adjacent to one another, it is possible to produce the component with a particularly high quality, in particular seamlessly.

According to some embodiments, provision is made for the control device to be configured to generate the irradiation regions in the form of strips, that is to say to generate strip-shaped irradiation regions. This configuration has proved to be particularly advantageous for high-quality and at the same time productive manufacture of components. The strips or strip-shaped irradiation regions are preferably oriented parallel to one another. The strips preferably adjoin one another, particularly preferably without overlapping; however, an overlap is also possible at least in regions.

The second irradiation region preferably extends parallel to the first irradiation region. This applies to a particularly great extent when the irradiation regions are in the form of strips. All of the irradiation regions are preferably defined such that they extend parallel to one another.

The displacement direction of the irradiation sections in the various irradiation regions is preferably also selected to be the same at least for the first irradiation region and the second irradiation region, preferably for all irradiation regions, in particular to be parallel and with the same orientation. The irradiation thus preferably takes place in the same direction in the various irradiation regions. In this case, the second energy beam in particular follows the first energy beam in a spatially offset and preferably temporally offset manner.

The control device is preferably configured to generate the irradiation regions in the form of strips such that a strip length of a strip as measured in the longitudinal direction of this strip of the strips is greater than an extent of the blocking region assigned to the strip as measured in the same direction, specifically in the longitudinal direction of this strip. The strip or strip-shaped irradiation region thus preferably protrudes beyond the blocking region; it is in particular larger—at least along the longitudinal direction—than the blocking region. The blocking region may therefore in particular be displaced in the longitudinal direction within the strip.

The displacement direction of the irradiation section within the strip-shaped irradiation region preferably extends in the longitudinal direction of the strip.

In this case, a strip is defined in particular by virtue of it having, toward the working region, a larger dimension than in the other direction orthogonal thereto. The direction of the larger dimension is referred to as longitudinal direction, and the direction of smaller dimension and orthogonal thereto is referred to as width direction. The extent or dimension along the longitudinal direction is referred to as length; the extent or dimension along the width direction is referred to as width.

According to some embodiments, provision is made for the control device to be configured to define the irradiation regions such that they are oriented transverse to the protective gas flow direction. This means in particular that the irradiation regions intersect the protective gas flow direction at an angle other than 0° and 180°. The angle at which the irradiation regions intersect the protective gas flow direction is preferably also other than 90° and 270°. The irradiation regions thus extend in particular preferably obliquely to the protective gas flow direction. The displacement direction of the irradiation sections preferably also extends transversely within the irradiation regions, in particular obliquely to the protective gas flow direction, in particular while avoiding the abovementioned angles.

The corresponding orientation of the irradiation regions and/or of the displacement directions within the irradiation regions preferably avoids in particular influencing locations that are irradiated later with contaminants that have arisen at previously irradiated locations due to the protective gas flow direction.

According to some embodiments, provision is made for the control device to be configured to perform the irradiation of the irradiation regions with irradiation vectors that are parallel and/or antiparallel to one another and that are worked through in succession along the displacement direction of the respective irradiation section. The irradiation vectors of one and the same irradiation region have in particular a mutually identical orientation, or they have an orientation counter to one another, that is to say rotated by 180°; they are thus oriented identically or in particular alternately opposite to one another. In some embodiments, it is in particular possible for mutually directly adjacent irradiation vectors to be oriented antiparallel to one another. An irradiation region is thus in particular irradiated such that it is passed over by the assigned energy beam in the form of irradiation vectors arranged next to one another in parallel or antiparallel, successively and in a direct temporal order of the directly adjacent irradiation vectors. The irradiation section is in this case in particular the region of the irradiation vector that is currently being generated. The displacement direction of the irradiation section is thus in particular given by the order in which the irradiation vectors generated in temporal succession are worked through. The irradiation vectors are preferably oriented perpendicular to the displacement direction; put the other way round, the displacement direction of the irradiation section is preferably perpendicular to the individual irradiation vectors.

An irradiation vector is understood to mean in particular a continuous linear displacement of the energy beam within an irradiation region over a particular path with a particular displacement direction, in particular in the width direction of an irradiation region in the form of strips. The irradiation vector thus includes the direction or orientation of the displacement as its orientation. An irradiation region is in particular passed over sequentially with a multiplicity of irradiation vectors.

The fact that the displacement takes place continuously means in particular that it takes place without stopping or interrupting the energy beam, in particular without any jumps. The fact that the irradiation takes place linearly means in particular that it takes place along a straight line.

If the irradiation regions are in the form of strips, the irradiation vectors preferably extend in the width direction of the respective strip, that is to say perpendicular to the longitudinal extent of the strip. The irradiation vector preferably extends along the entire width of the strip-shaped irradiation region. The width of the irradiation region thus preferably defines the length of the irradiation vector. In particular, a strip-shaped irradiation region is preferably passed over sequentially by a multiplicity of irradiation vectors that are oriented in the width direction and arranged offset from one another or next to one another in the longitudinal direction of the irradiation region.

The control device is preferably configured to block a first angle range of 60° to 120° and a second angle range of 240° to 300° with respect to the protective gas flow direction for the irradiation vectors. This advantageously makes it possible to ensure in particular that the displacement direction of the irradiation sections is oriented such that the working region is able to be treated at times simultaneously but with a spatial and preferably temporal offset by multiple energy beams in adjacent irradiation regions, without the energy beams being alternately impaired by the contaminants that they generate due to the protective gas flow. In this case, the temporal offset refers here, above and below to a beginning of the irradiation with the various energy beams, and thus does not contradict irradiation that is at times simultaneous.

The control device is preferably configured to select an angle between the protective gas flow direction and the irradiation vectors of an irradiation region between 22.5° inclusive and 60° inclusive, or between 120° inclusive and 240° inclusive, or between 300° inclusive and 337.5° inclusive. The control device is preferably configured to select an angle between the protective gas flow direction and the irradiation vectors of an irradiation region between 20° inclusive and 60° inclusive, or between 120° inclusive and 240° inclusive, or between 300° inclusive and 340° inclusive.

The control device is preferably configured to select the orientation of the irradiation vectors such that it is oriented, at least componentwise, counter to the protective gas flow direction. This advantageously makes it possible to ensure that the irradiation takes place locally such that locations that are irradiated later in time are not impaired, due to the protective gas flow, by contaminants that originate from locations that were irradiated previously in time. The term "componentwise" means that the displacement direction, when broken down into vectors, in any case has a vector component that is oriented counter to the protective gas flow direction.

The control device is preferably configured to block angle ranges of 70° to 110° and of 250° to 290°, preferably of 80° to 100° and of 260° to 280°, preferably of 85° to 95° and of 265° to 275°, preferably of 88° to 92° and of 268° to 272°.

According to some embodiments, provision is made for the control device to be configured to block an angle range of 150° to 210° with respect to the protective gas flow direction for the displacement direction of the irradiation sections within the respectively assigned irradiation region from the respective starting position to the respective end position. This makes it possible, in a particularly expedient manner, for the first energy beam and the second energy beam to be able to treat adjacent irradiation regions with a spatial and preferably temporal offset, but at times simultaneously, without in the process being exposed to mutual contamination due to the protective gas flow.

The control device is preferably configured to block an angle range of 160° to 200°, preferably of 170° to 190°, preferably of 175° to 185°, preferably of 178° to 182°.

Preferably, an angle range of +22.5° to −22.5°, that is to say, in other words, of 337.5° to 22.5°, preferably of 340° to 20°, with respect to the protective gas flow direction is additionally blocked for the displacement direction. This makes it possible in particular to avoid impairing locations that are irradiated later with contaminants from previously irradiated locations, including within the individual irradiation regions.

The control device is preferably configured to select an angle between the protective gas flow direction and the displacement direction between 22.5° inclusive and 150° inclusive, or between 210° inclusive and 337.5° inclusive. Both of the following criteria may thereby advantageously be taken into consideration in particular: Firstly, sufficient avoidance of impairment of locations that are irradiated later with contaminants from previously irradiated locations, including within the individual irradiation regions, and secondly orienting the displacement direction of the irradiation sections such that the working region is able to be irradiated with the various energy beams such that they do not interfere with one another, in a spatially and preferably temporally offset but at times simultaneous manner. The control device is preferably configured to select an angle between the protective gas flow direction and the displacement direction between 20° inclusive and 150° inclusive, or between 210° inclusive and 340° inclusive.

Efficient irradiation of the working region with a plurality of energy beams is thus preferably ensured in particular by defining specific blocking angle ranges or forbidden angle zones for the displacement direction of the irradiation sections.

According to some embodiments, provision is made for the control device to be configured to predefine the displacement direction such that the displacement direction is oriented, at least componentwise, counter to the protective gas flow direction. This in particular advantageously makes it possible to avoid locations irradiated at a later time within an irradiation region being impaired by contaminants that originate from previously irradiated locations of the same irradiation region. Such impairment may however at least be reduced. In this case too, the term "componentwise" means that the displacement direction, when broken down into vectors, in any case has a vector component that is oriented counter to the protective gas flow direction.

The control device is preferably configured to perform the irradiation of the working region with the plurality of energy beams for a plurality of powder material layers that are to be irradiated in particular sequentially in succession, and to select an orientation of the irradiation regions, in particular the displacement direction of the irradiation sections, for at least one, preferably for each powder material layer of the powder material layers following a previous powder material layer, differently than for the previous powder material layer. An orientation is in this case understood to mean an angle formed by a particular direction, in particular longitudinal direction, of an irradiation region and a predetermined axis on the working region. If the irradiation regions are in the form of strips, the orientation is in particular an angle formed by the longitudinal direction of the irradiation regions, preferably parallel to one another, and a predetermined axis on the working region. Changing the orientation of the irradiation regions from the previous powder material layer to the following powder material layer, in particular from powder material layer to powder material layer, avoids identically oriented irradiation of—in particular directly—adjacent powder material layers, which in turn increases component quality. The strip-shaped irradiation regions of two successive arrangements in particular preferably form a finite angle, in particular other than 0° and 180°, with one another.

In particular, in this process, the angle blocking ranges described above are preferably taken into consideration.

According to some embodiments, the orientation of the irradiation regions is rotated by a predetermined angle from powder material layer to powder material layer. However, it is preferably checked in the process whether the instantaneous angle is within one of the angle blocking ranges described above; if this is the case, the angle is discarded and another angle is selected, for example by performing another rotation by the predetermined angle.

According to some embodiments, provision is made for the control device to be configured to define more than two irradiation regions for more than two energy beams. This allows particularly fast and efficient manufacture of a component. In particular, the beam generation device is preferably configured to generate more than two energy beams, in particular three energy beams, in particular four energy beams, or more than four energy beams, wherein the scanner device is preferably configured to irradiate the working region locally and selectively with more than two energy beams, in particular with three energy beams, in particular with four energy beams, or with more than four energy beams, preferably with all available energy beams of the beam generation device, at least at times simultaneously but in a spatially offset manner.

In this case, each energy beam is assigned a separate irradiation region, wherein irradiation regions directly adjacent to one another are in particular preferably always assigned to different energy beams. The second irradiation region that is assigned to the second energy beam is in this respect preferably directly adjacent to a third irradiation region on a side remote from the first irradiation region, which third irradiation region is assigned to a third energy beam. This may possibly in turn be assigned a fourth irradiation region on a side remote from the second irradiation region, which fourth irradiation region is then assigned to a fourth energy beam, or else again to the first energy beam. It is obvious that this may be continued in this way for any desired number of energy beams. In this case, irradiation of a following irradiation region is begun in each case with the following energy beam-preferably at a time after a beginning of the irradiation of the previous irradiation region with the previous energy beam-when the previous irradiation section and the following starting position for the following irradiation section are not arranged within the interaction zone defined by the protective gas flow direction relative to one another. The criteria explained above, in particular the blocking regions and/or the starting conditions, are then preferably accordingly also applied in the same way as was described above in connection with the first irradiation region and the second irradiation region. In this respect, the procedure described above in connection with the first irradiation region and the second irradiation region should be understood to be a principle that is able to be applied to any desired number of different energy beams and different irradiation regions and may in particular be iterated.

According to some embodiments, provision is made for the control device to be configured to define at least one blocking region, selected from the blocking regions, such that the at least one blocking region has a predetermined—in particular finite—extent in the protective gas flow direction. This is based on the concept that material transport, in particular contaminant transport, due to the protective gas flow, potentially takes place only over a certain distance—at least to a relevant extent—such that the blocking region does not necessarily have to extend up to a working region boundary of the working region in the direction of the protective gas flow. This potentially allows the simultaneous use of an energy beam at a location downstream of the irradiation section assigned to a blocking region, provided that this location is arranged beyond a blocking region boundary, that is to say outside the blocking region as seen in the protective gas flow direction. The flexibility of the manufacturing device may thereby be increased.

As an alternative, provision is preferably made for the control device to be configured to define the at least one blocking region such that it extends up to the working region boundary in the protective gas flow direction. This may make sense in particular in the case of small working regions, or it leads to simplification of the definition of the blocking region, with no possibly variable parameters such as an extent of transport of contaminants by the protective gas flow having to be taken into consideration when defining the blocking regions. The manufacturing device may thus be of simpler design.

The blocking region preferably has a predetermined—in particular finite—extent counter to the protective gas flow direction and/or perpendicular to the protective gas flow direction, wherein the extent is selected in particular depending on at least one material parameter and/or treatment parameter. It extends in particular within the working region around the irradiation section assigned thereto and—in the protective gas flow direction—downstream of the irradiation section. In particular in the region of a local environment around the assigned irradiation section, smoke, powder deposits and/or spray and possibly other contaminants may also be transported laterally to the protective gas flow direction or counter to the protective gas flow direction.

Embodiments of the present invention provide a method for the additive manufacture of a component from a powder material by way of a manufacturing device according to the invention or a manufacturing device according to one of the preceding embodiments. In this case, a working region is irradiated locally and selectively with a plurality of energy beams in order to produce the component from the powder material arranged in the working region by way of the energy beams, wherein a protective gas flow with a particular protective gas flow direction is generated over the working region. A first irradiation region is defined on the working region for a first energy beam of the plurality of energy beams, along which a first irradiation section for the first energy beam is displaced within the first irradiation region from a first starting position to a first end position. A second irradiation region is defined on the working region for a second energy beam of the plurality of energy beams, along which a second irradiation section for the second energy beam is displaced within the second irradiation region from a second starting position to a second end position. Irradiation of the second irradiation region with the second energy beam is begun—preferably at a time after the irradiation of the first irradiation region with the first energy beam—when the first irradiation section and the second starting position for the second irradiation section are not arranged within an interaction zone defined by the protective gas flow direction relative to one another. In particular the advantages that have already been explained in connection with the manufacturing device are achieved in connection with the method.

According to some embodiments, provision is made, based on the first irradiation section, to determine a first blocking region that is displaced along the first irradiation region with the first irradiation section. As an alternative or in addition, based on the second irradiation section, a second blocking region is determined, this being displaced along the second irradiation region with the second irradiation section.

According to some embodiments, provision is made for the irradiation of the second irradiation region with the second energy beam to be begun only when at least one starting condition is met, this being selected from a group consisting of: The second starting position is not located within the first blocking region; the first irradiation section is not located within the second blocking region at the second starting position, and the first blocking region and the second blocking region do not overlap one another.

In some embodiments, the method comprises at least one method step that has already been described above in connection with the manufacturing device as a configuration according to embodiments of the present invention.

In particular, the first irradiation region and the second irradiation region are preferably defined directly adjacent to one another on the working region, in particular such that the first irradiation region and the second irradiation region adjoin one another.

The irradiation regions are preferably generated in the form of strips, in particular such that a strip length of a strip as measured in the longitudinal direction of this strip of the strips is greater than an extent of the blocking region assigned to the strip as measured in the longitudinal direction.

The irradiation regions are preferably irradiated with irradiation vectors that are parallel or antiparallel to one another and that are worked through in succession along the displacement direction. In this case, a first angle range of 60° to 120° and a second angle range of 240° to 300° with respect to the protective gas flow direction are preferably blocked for the irradiation vectors.

The irradiation vectors are preferably oriented, at least componentwise, counter to the protective gas flow direction.

An angle range of 150° to 210° with respect to the protective gas flow direction is preferably blocked for the displacement direction.

The displacement direction of the irradiation section within the respectively assigned irradiation region from the respective starting position to the respective end position is preferably predefined such that the displacement direction is oriented, at least componentwise, counter to the protective gas flow direction.

More than two irradiation regions for more than two energy beams are preferably defined.

At least one blocking region is preferably defined such that the at least one blocking region has a predetermined—in particular finite—extent in the protective gas flow direction or extends up to a working region boundary of the working region. The blocking region is preferably defined such that it has a predetermined—in particular finite—extent counter to the protective gas flow direction and/or perpendicular to the protective gas flow direction.

A laser is preferably used as beam generation device.

The component is preferably manufactured by way of selective laser sintering and/or selective laser melting.

A metal or ceramic powder may in particular preferably be used as powder material.

Embodiments of the present invention provide a computer program product that contains machine-readable instructions based on which a method according to the invention or a method according to one of the embodiments described above is performed on a computing device, in particular a control device, when the computer program product runs on the computing device. In particular the advantages that have already been explained in connection with the manufacturing device are afforded in connection with the computer program product.

Figure 1:
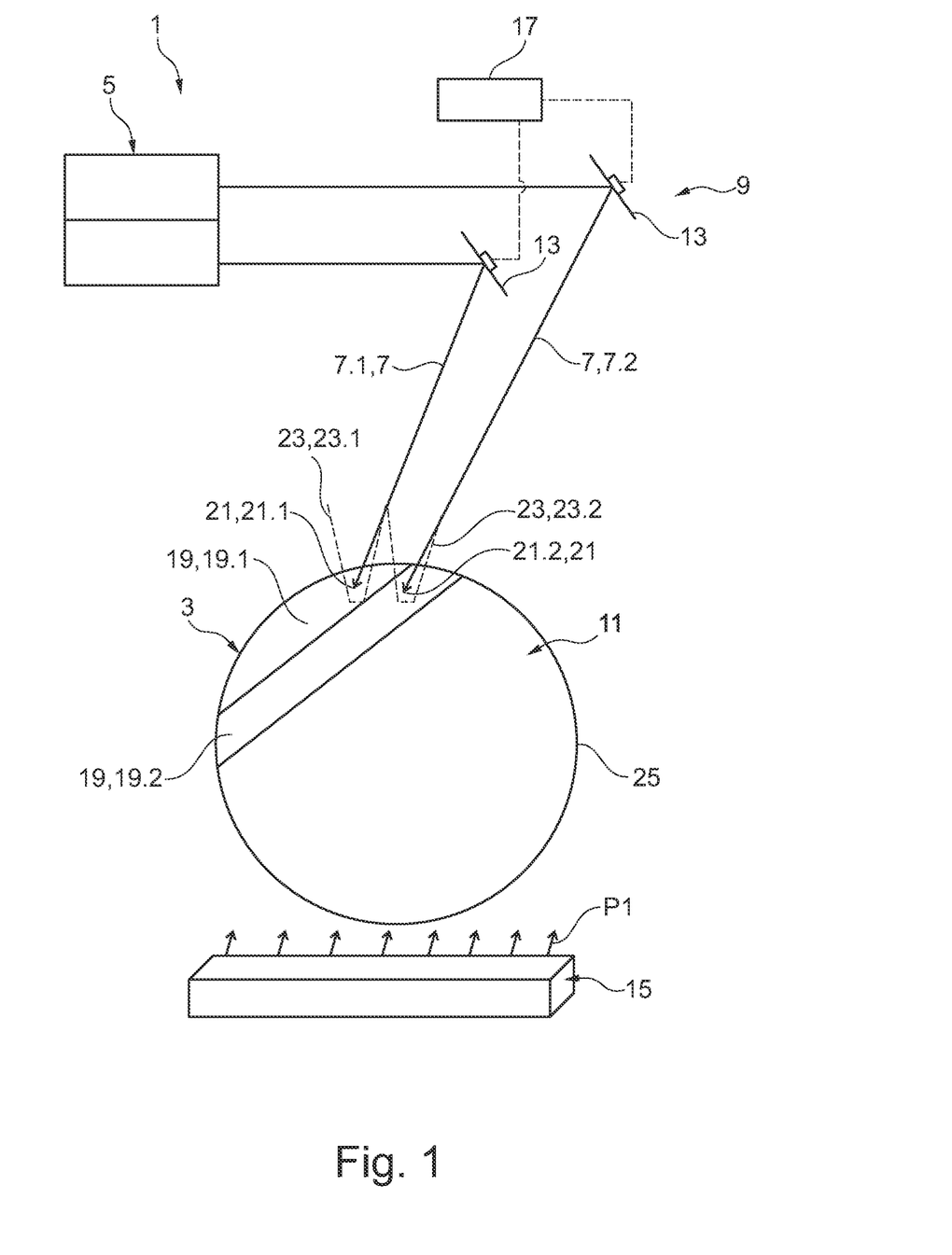
FIG. 1 shows an exemplary embodiment of a manufacturing device for the additive manufacture of components from a powder material.

FIG. 1 shows a schematic illustration of an exemplary embodiment of a manufacturing device 1 for the additive manufacture of a component 3 from a powder material. The manufacturing device 1 has a beam generation device 5 that is configured to generate a plurality of energy beams 7. The beam generation device 5 may in this case for example have a plurality of lasers, or else one laser that interacts with a beam splitter device, for example a beam splitter, in order to generate the plurality of energy beams 7. In some embodiments, the energy beams 7 are in the form of laser beams.

The manufacturing device 1 additionally has a scanner device 9 that is configured to locally and selectively irradiate a working region 11 with the energy beams 7 at least at times in order to produce the component 3 from the powder material arranged in the working region 11 by way of the energy beams 7. The scanner device 9 may in particular have a separately driveable scanner 13, for example a galvo scanner, for each energy beam 7.

The manufacturing device 1 furthermore has a protective gas device 15 that is configured to generate a protective gas flow with a defined protective gas flow direction—illustrated here by first arrows P1, with only one of the first arrows being identified by the corresponding reference sign for the sake of clarity—over the working region 11.

The manufacturing device 1 furthermore has a control device 17 that is operatively connected to the scanner device 9, here in particular to the individual scanners 13, and is configured to drive the scanner device 9, in particular the individual scanners 13, separately.

The control device 17 is furthermore configured to define a first irradiation region 19.1 of a plurality of irradiation regions 19 on the working region 11 for a first energy beam 7.1 of the plurality of energy beams 7, wherein a first irradiation section 21.1 of a plurality of irradiation sections 21 is displaced along the first irradiation region 19.1 from a first starting position to a first end position within the first irradiation region 19.1. A second irradiation region 19.2 is defined upstream—with respect to the protective gas flow direction—of the first irradiation region 19.1 on the working region 11 for a second energy beam 7.2 of the plurality of energy beams 7, wherein, along the second irradiation region 19.2, a second irradiation section 21.2 for the second energy beam 7.2 is displaced within the second irradiation region 19.2 from a second starting position to a second end position.

The control device 17 furthermore begins irradiation of the second irradiation region 19.2 with the second energy beam 7.2—preferably at a time after a beginning of the irradiation of the first irradiation region 19.1 with the first energy beam 7.1—only when the first irradiation section 21.1 and the second starting position for the second irradiation section 21.2 are no longer arranged within an interaction zone defined by the protective gas flow direction relative to one another. This advantageously makes it possible to prevent the irradiation regions 19 being mutually negatively influenced by contaminants that arise in the respective other irradiation region 19 upon irradiation with the energy beams 7 and are conveyed over the working region 11 by the protective gas flow—in particular in the protective gas flow direction. This procedure additionally allows the energy beams 7 to irradiate the working region 11 at times simultaneously in a manner comparatively close to one another, so as to be able to achieve high efficiency and at the same time good quality, in particular as far as possible seamless construction of the component 3. It is in particular advantageously possible to utilize preheating of the resulting component 3 by the first energy beam 7.1 in the irradiation by way of the second energy beam 7.2.

In particular, the control device 17 preferably determines, based on the first irradiation section 21.1, a first blocking region 23.1 of a plurality of blocking regions 23 that is displaced along the first irradiation region 19.1 with the first irradiation section 21.1. As an alternative or in addition, based on the second irradiation section 21.2, a second blocking region 23.2 is determined, this being displaced along the second irradiation region 19.2 with the second irradiation section 21.2.

The irradiation of the second irradiation region 19.2 with the second energy beam 7.2 is preferably begun only when at least one starting condition is met, this being selected from a group consisting of: The second starting position is not located in the first blocking region 23.1; the first irradiation section 21.1 is not located within the second blocking region 23.2; and the first blocking region 23.1 and the second blocking region 23.2 do not overlap one another. The irradiation of the second irradiation region 19.2 is preferably begun only when at least two of said conditions are met. The irradiation of the second irradiation region 19.2 is preferably begun only when all three conditions are met.

The first irradiation region 19.1 and the second irradiation region 19.2 are preferably defined directly adjacent to one another on the working region 11, in particular such that the first irradiation region 19.1 and the second irradiation region 19.2 adjoin one another.

The irradiation regions 19 are preferably generated in the form of strips, in particular such that a strip length of a strip as measured in the longitudinal direction of this strip is greater than an extent of the blocking region 23 assigned to the strip as measured in the same longitudinal direction.

The irradiation regions 19 are preferably oriented transversely to the protective gas flow direction, in particular obliquely to the protective gas flow direction.

The blocking regions 23 are preferably defined such that they extend up to a working region boundary 25 of the working region 11 in the protective gas flow direction or have a predetermined extent in the protective gas flow direction. The blocking regions 23 are preferably defined such that they have a predetermined extent counter to the protective gas flow direction and/or perpendicular to the protective gas flow direction.

Figure 2:
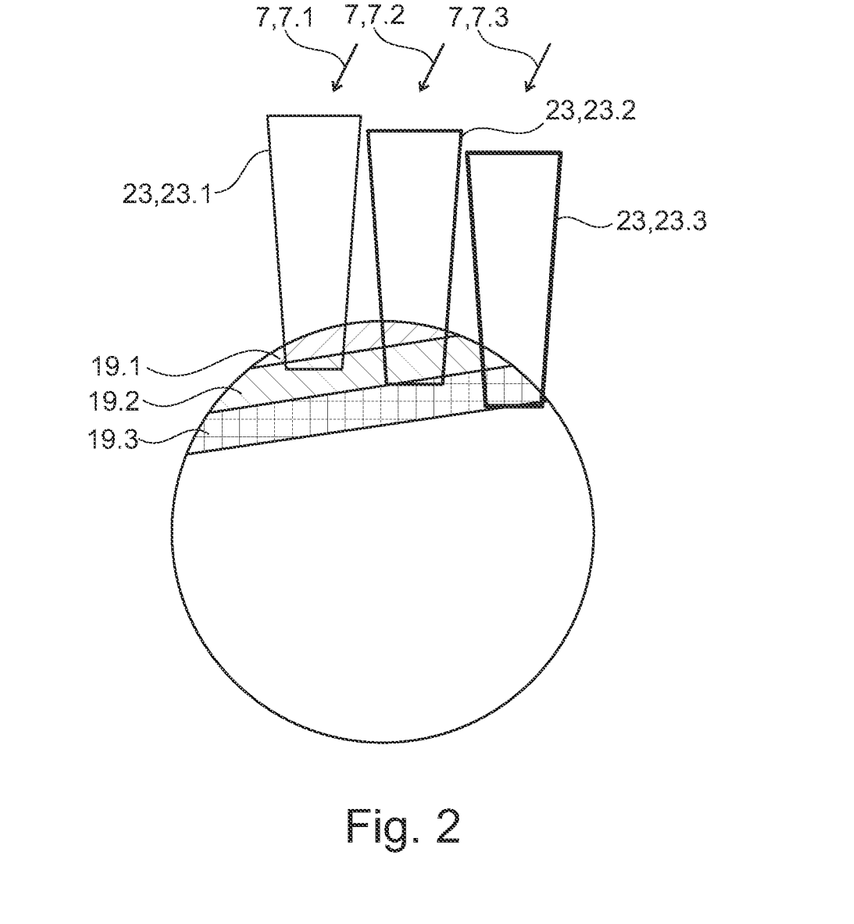
FIG. 2 shows a schematic illustration of a method for the additive manufacture of a component according to some embodiments.

FIG. 2 shows a schematic illustration of a first embodiment of a method for the additive manufacture of a component 3 from a powder material, with the manufacturing device 1 according to FIG. 1 preferably being used in the course of the method.

Elements that are the same or functionally the same are provided with the same reference signs in all of the figures, and so to this extent reference is respectively made to the foregoing description.

In the course of the method, the method steps already described explicitly or at least implicitly above in connection with the manufacturing device 1 are in particular performed. It is illustrated here in particular that, in some embodiments, more than two irradiation regions 19 for more than two energy beams 7 are defined. In this respect, three energy beams 7 are shown purely schematically here, specifically a first energy beam 7.1, a second energy beam 7.2 and a third energy beam 7.3, and also a first irradiation region 19.1, a second irradiation region 19.2 and a third irradiation region 19.3. For the irradiation of the first irradiation region 19.1 and of the second irradiation region 19.2, nothing different applies than was explained above in connection with FIG. 1; the procedure for the beginning of the irradiation of the third irradiation region 19.3 is thus as though the second irradiation region 19.2 were the assigned first irradiation region therefor, and as though the third irradiation region 19.3 were a correspondingly assigned second irradiation region. The method is thus simply iterated for further irradiation regions 19 and energy beams 7 to be added. The blocking regions 23 respectively assigned to the irradiation regions 19 are also illustrated.

Figure 3A:
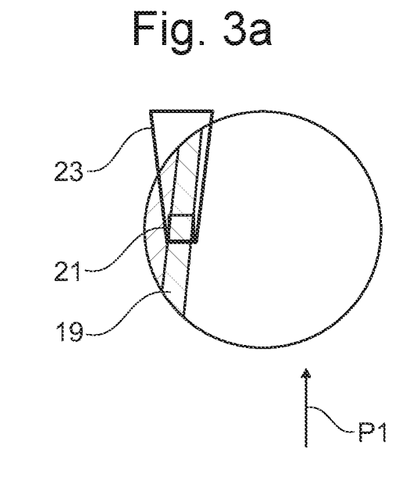
FIGS. 3a, 3b, and 3c show a schematic illustration of a method for the additive manufacture of a component according to some embodiments.
Figure 3B:
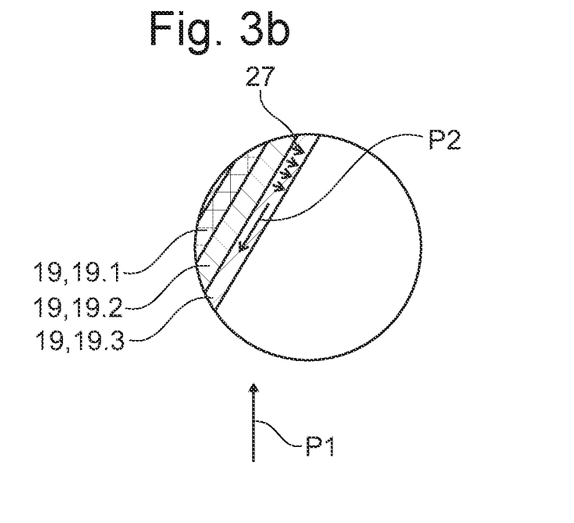
Figure 3C:
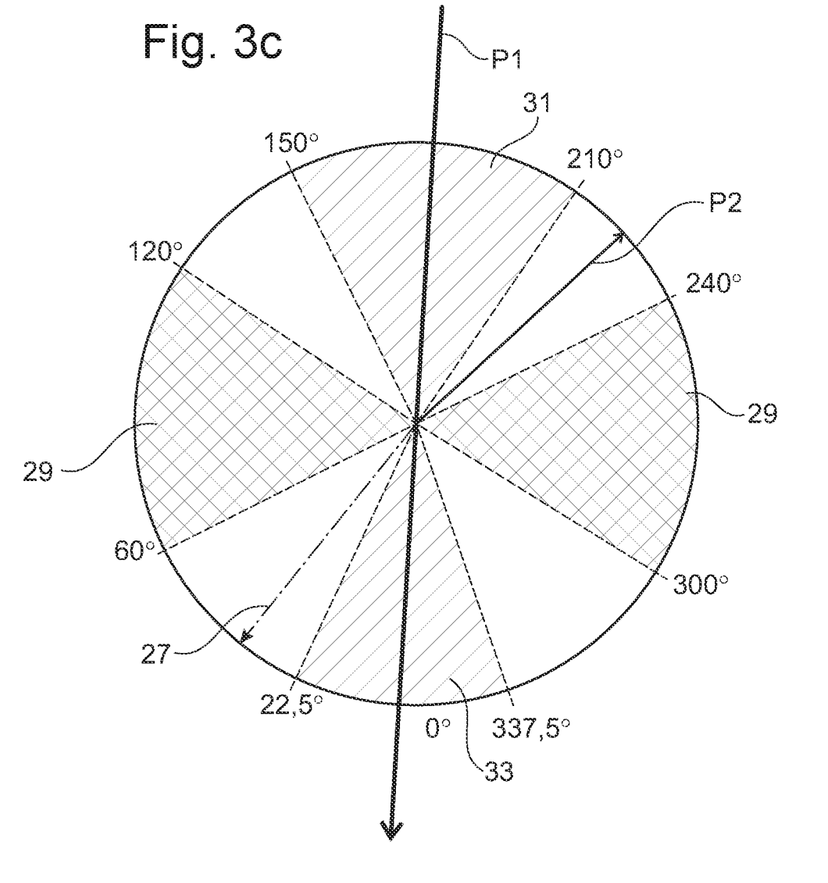

FIG. 3 shows a schematic illustration of a second embodiment of the method.

a) illustrates a situation in which the orientation of a strip-shaped irradiation region 19 and thus at the same time a displacement direction of the irradiation section 21 in the irradiation region 19 forms a very acute angle with the protective gas flow direction-which is in turn illustrated by the first arrow P1. The displacement direction is in this case preferably oriented parallel to the longitudinal direction of the strip-shaped irradiation region 19 and preferably runs, at least componentwise, counter to the protective gas flow direction, here specifically in particular from the top right to the bottom left. Also illustrated is the blocking region 23, which results from the irradiation section 21 in this situation. It becomes clear here that the blocking region 23, in such an orientation of the irradiation region 19, overlaps adjacent irradiation regions 19 in each position of the irradiation section 21. Treatment of a directly adjacent irradiation region 19 with a further energy beam 7 thus cannot be enabled at any time. This considerably reduces the flexibility of the use of the energy beams 7 and thus at the same time the efficiency of the manufacture of the component 3.

In order to avoid this, angle blocking ranges are preferably defined for the orientation of the irradiation regions 19 or—and which is preferably synonymous, in any case for strip-shaped irradiation regions 19—for the displacement direction, that is to say ranges of forbidden angles that the orientation of the irradiation regions 19 or the displacement direction is not allowed to adopt with respect to the protective gas flow direction. Of course, it is also possible to define positively angle ranges in exactly the same way, only these being allowed to be adopted by the orientation of the irradiation regions 19 or the displacement direction with respect to the protective gas flow direction.

b) illustrates a situation in which the irradiation regions 19 are oriented relative to the protective gas flow direction— again illustrated by the first arrow P1—such that at least at times simultaneous treatment of the directly adjacent irradiation regions 19 by different energy beams 7 is possible.

c) illustrates corresponding options for defining such angle ranges.

The irradiation regions 19 are preferably passed over by irradiation vectors 27 that are parallel or antiparallel to one another and that are worked through in succession along the displacement direction, illustrated here by a second arrow P2. The irradiation vectors 27 of one and the same irradiation region 19 have an orientation identical to one another or alternately rotated by 180°. The irradiation vectors 27 and the second arrow P2 indicating the displacement direction are also illustrated schematically in b) for improved clarity and depicted in the third irradiation region 19.3 there. It becomes clear here that the displacement direction is preferably oriented perpendicular to the irradiation vectors 27, wherein the irradiation vectors 27 preferably extend in the width direction of the strip-shaped irradiation regions 19, preferably over an entire width. The width of the irradiation regions 19 thus defines the length of the irradiation vectors 27.

c) again illustrates various angle blocking ranges, specifically two first cross-hatched angle blocking ranges 29 for the irradiation vectors 27, that is to say angle ranges that the irradiation vectors 27 are not allowed to adopt relative to the protective gas flow direction, again also illustrated here by the first arrow P1.

In this case, a first angle range of 60° to 120° and a second angle range of 240° to 300° with respect to the protective gas flow direction are in particular blocked as first angle blocking ranges 29 for the irradiation vectors 27.

Furthermore, a third angle range of 337.5° to 22.5°, preferably of 340° to 20°, is preferably blocked for the irradiation vectors 27, so that these are not oriented excessively in the protective gas flow direction.

The irradiation vectors 27 are preferably oriented, at least componentwise, counter to the protective gas flow direction.

A second angle blocking range 31 is illustrated in single-hatched form, this being defined for the displacement direction-illustrated by the second arrow P2. This second angle blocking range 31 of 150° to 210° with respect to the protective gas flow direction is in particular blocked for the displacement direction of the irradiation sections 21 within the respectively assigned irradiation region 19 from the respective starting position to the respective end position.

The third angle range of 337.5° to 22.5°, preferably of 340° to 20°, is preferably also additionally blocked for the displacement direction, this range being illustrated in single-hatched form as third angle blocking range 33. This effectively prevents the displacement direction from being oriented excessively in the protective gas flow direction, owing to which contaminants arising at previously irradiated locations would be introduced into locations that are irradiated later due to the protective gas flow.

The displacement direction is preferably predefined such that it is oriented, at least componentwise, counter to the protective gas flow direction.

The third angle blocking range 33 is in particular preferably blocked both for the displacement directions and for the irradiation vectors 27.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A manufacturing device for additive manufacture of components from a powder material, the manufacturing device comprising:
    a beam generation device configured to generate a plurality of energy beams,
    a scanner device configured to locally and selectively irradiate a working region with the plurality of energy beams in order to produce a component from the powder material arranged in the working region,
    a protective gas device configured to generate a protective gas flow with a defined protective gas flow direction over the working region, and
    a control device operatively connected to the scanner device and configured to drive the scanner device, wherein a computer program product comprising machine-readable instructions runs on the control device causing the control device to:
        define a first irradiation region on the working region for a first energy beam of the plurality of energy beams, wherein a first irradiation section for the first energy beam is displaced within the first irradiation region from a first starting position to a first end position:
        define a second irradiation region upstream of the first irradiation region on the working region for a second energy beam of the plurality of energy beams, wherein a second irradiation section for the second energy beam is displaced within the second irradiation region from a second starting position to a second end position,
        begin irradiation of the second irradiation region with the second energy beam when the first irradiation section and the second starting position for the second irradiation section are not arranged within an interaction zone defined by the protective gas flow direction relative to one another, and
        perform irradiation of the first irradiation region and the second irradiation region with irradiation vectors that are parallel and/or antiparallel to one another, the irradiation vectors being worked through in succession along a displacement direction, wherein the control device is configured to block an angle range of 150° to 210° with respect to the protective gas flow direction for the displacement direction.

2. The manufacturing device as claimed in claim 1, wherein the control device is configured to,
    based on the first irradiation section, determine a first blocking region that is displaced along the first irradiation region with the first irradiation section, and/or, based on the second irradiation section, determine a second blocking region that is displaced along the second irradiation region with the second irradiation section.

3. The manufacturing device as claimed in claim 2, wherein the control device is configured
to begin the irradiation of the second irradiation region with the second energy beam only when at least one starting condition is met, wherein the at least one starting condition is selected from a group consisting of: the second starting position is not located in the first blocking region, the first irradiation section is not located within the second blocking region at the second starting position, and the first blocking region and the second blocking region do not overlap with one another.

4. The manufacturing device as claimed in claim 1, wherein the control device is configured to define the first irradiation region and the second irradiation region directly adjacent to one another on the working region, such that the first irradiation region and the second irradiation region adjoin one another.

5. The manufacturing device as claimed in claim 1, wherein the control device is configured to generate the first irradiation region and the second irradiation region as strips, such that a strip length of a strip as measured in a longitudinal direction of the strip is greater than an extent of the blocking region assigned to the strip as measured in the longitudinal direction.

6. The manufacturing device as claimed in claim 1, wherein the control device is configured to define the first irradiation region and the second irradiation region such that the first irradiation region and the second irradiation region are oriented transverse to the protective gas flow direction.

7. The manufacturing device as claimed in claim 1, wherein the control device is further configured to block a first angle range of 60° to 120° and a second angle range of 240° to 300° with respect to the protective gas flow direction for the irradiation vectors.

8. The manufacturing device as claimed in claim 1, wherein the control device is configured to predefine the displacement direction such that the displacement direction is oriented, at least component wise, in an angle range of 210° to 275° or in an angle range of 90° to 150° with respect to the protective gas flow direction.

9. The manufacturing device as claimed in claim 1, wherein the control device is configured to define more than two irradiation regions for more than two energy beams.

10. The manufacturing device as claimed in claim 1, wherein the control device is configured to define at least one blocking region, selected from blocking regions, such that the at least one blocking region has a predetermined extent in the protective gas flow direction or extends up to a working region boundary of the working region.

11. A method for additive manufacture of a component from a powder material using a manufacturing device as claimed in claim 1, the method comprising:
irradiating a working region locally and selectively with a plurality of energy beams in order to produce the component from the powder material arranged in the working region,
generating a protective gas flow with a particular protective gas flow direction over the working region, wherein
a first irradiation region is defined on the working region for a first energy beam of the plurality of energy beams, wherein a first irradiation section for the first energy beam is displaced within the first irradiation region from a first starting position to a first end position,
a second irradiation region upstream of the first irradiation region is defined on the working region for a second energy beam of the plurality of energy beams, wherein a second irradiation section for the second energy beam is displaced within the second irradiation region from a second starting position to a second end position, and
irradiation of the second irradiation region with the second energy beam is begun when the first irradiation section and the second starting position for the second irradiation section are not arranged within an interaction zone defined by the protective gas flow direction relative to one another.

12. The method as claimed in claim 11, further comprising:
based on the first irradiation section, determining a first blocking region that is displaced along the first irradiation region with the first irradiation section, and/or
based on the second irradiation section, determining a second blocking region that is displaced along the second irradiation region with the second irradiation section.

13. The method as claimed in claim 12, wherein
the irradiation of the second irradiation region with the second energy beam is begun only when at least one starting condition is met, wherein the at least one starting condition is selected from a group consisting of: the second starting position is not located in the first blocking region: the first irradiation section is not located within the second blocking region at the second starting position; and the first blocking region and the second blocking region do not overlap with one another.

14. A computer program product, comprising machine-readable instructions for performing a method as claimed in claim 11 on a computing device when the computer program product runs on the computing device.

* * * * *